2 Sheets—Sheet 1.

S. P. M. TASKER.

Machine for Welding Metal Tubes.

No. 8,009. Reissued Dec. 25, 1877.

Witnesses:
W. R. Wright.
W. C. Kerwaidge,

Inventor
Stephen P. M. Tasker.
By his Attorney
Bonsall Taylor.

2 Sheets—Sheet 2.

S. P. M. TASKER.

Machine for Welding Metal Tubes.

No. 8,009. Reissued Dec. 25, 1877.

Witnesses:
W. R. Wright
O. C. Crawbridge

Inventor
Stephen P. M. Tasker.—
By his Attorney
J. Bonsall Taylor.—

UNITED STATES PATENT OFFICE.

STEPHEN P. M. TASKER, OF PHILADELPHIA, PENNSYLVANIA.

IMPROVEMENT IN MACHINES FOR WELDING METAL TUBES.

Specification forming part of Letters Patent No. 186,768, dated January 30, 1877; Reissue No. 8,009, dated December 25, 1877; application filed November 16, 1877.

*To all whom it may concern:*

Be it known that I, STEPHEN P. M. TASKER, of the city and county of Philadelphia, in the State of Pennsylvania, have invented certain new and useful Improvements in Machines for Welding Metal Tubes, of which I do hereby declare the following to be a full, clear, and precise description, and sufficient to enable those skilled in the art to which my improvements appertain to construct and employ the same, reference being had to the accompanying drawings, which form part of this specification, and of which—

Figure 1:
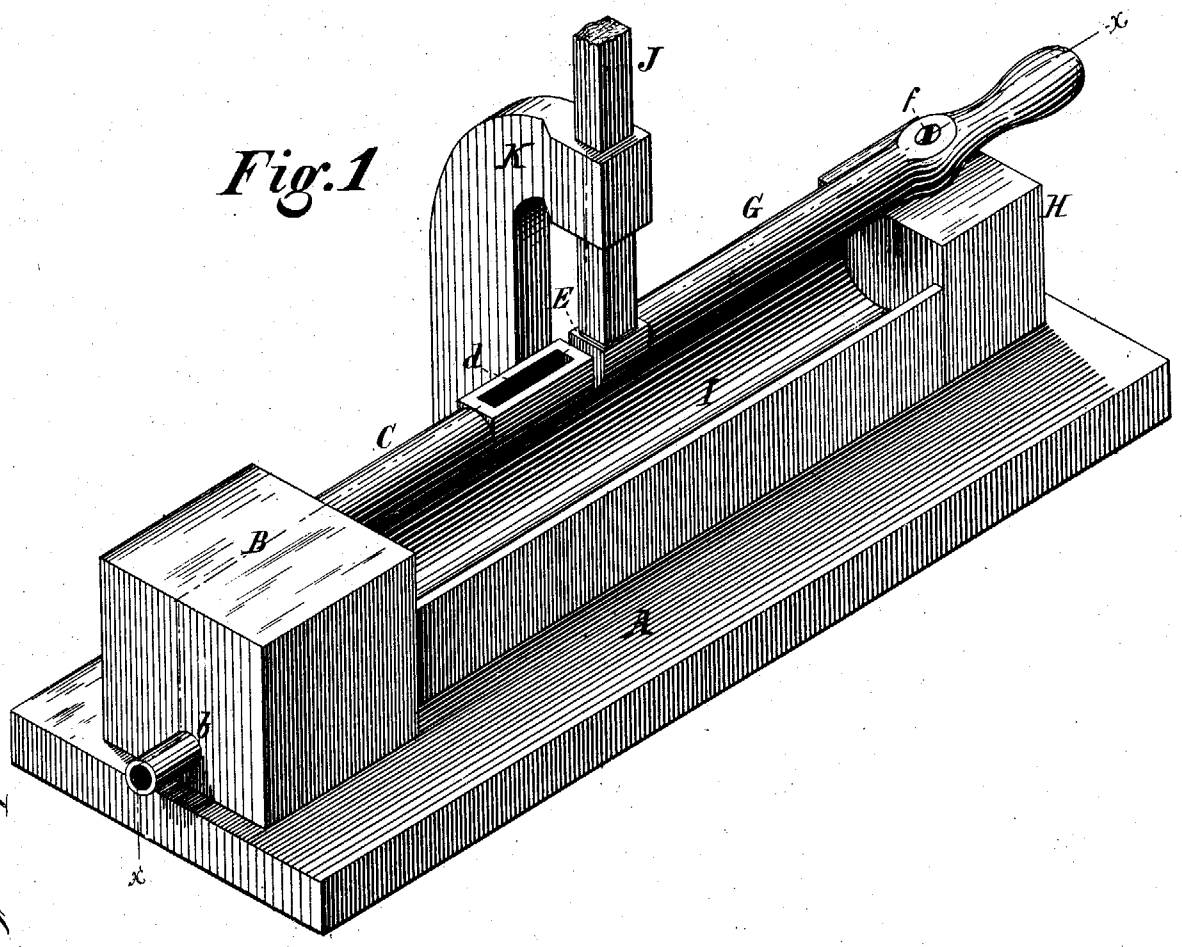
Figure 2:
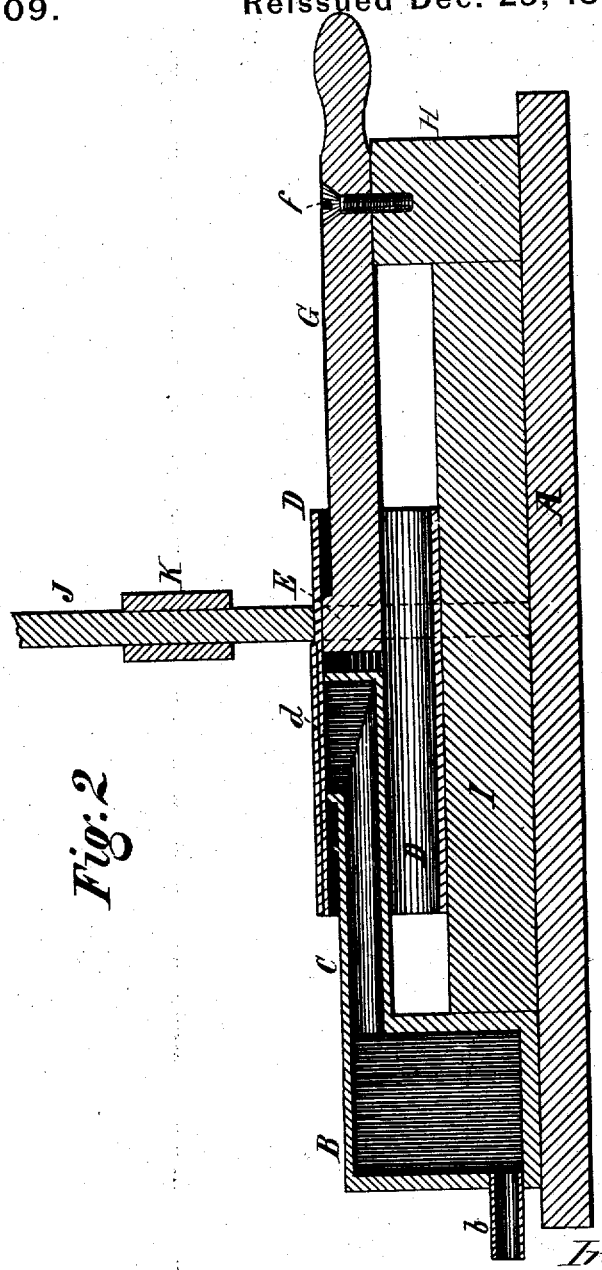

Figure 1 is an isometrical view of my improved apparatus; and Fig. 2, a longitudinal vertical section on the line *x x* of Fig. 1, the tube being in position for the welding operation.

Similar letters of reference indicate corresponding parts wherever used.

This invention is an improvement upon certain apparatus entitled "Machines for Heating and Welding the Edges of Plates for the Manufacture of Cylinders, &c.," patented to John James Russell, in and by English Letters Patent No. 435, of February 16, 1859; and consists in certain modifications and rearrangements of the said Russell apparatus—that is to say:

It consists in the combination of a furnace having a laterally-extending pipe, as above set forth, with a laterally-projecting pivoted bar, carrying an anvil at its extremity, and with a welding mechanism—such as a hammer, or the like—above said anvil-bar; such arrangement being substantially a combination of instrumentalities employed by Russell—viz., a furnace, an anvil upon a laterally-projecting bar, and a welding mechanism, but differing in the construction of the furnace, which is novel, in that it is equipped with a laterally-projecting heating-pipe, adapted to enter the tube and heat the interior of the seam, and also differing in the pivoting of the anvil-bar, which, however, is old, save in the combination specified, and which I hereby disclaim.

I also disclaim the arrangement of the heat-discharging opening in a heat-conducting device, when in line with an anvil and a welding mechanism, as that is provided for and explained in a portion of the Russell patent aforesaid.

It further consists in the employment, with the combined devices of furnace, anvil, and welding mechanism, when arranged and organized as above set forth, of a concave tube-supporting bed, of any desired radius to suit any desired size of tube.

I do not broadly claim upon a tube-support of any character in the above combination, as a support in the nature of a rolling carriage is old with Russell. The carriage, however, being expensive, I substitute the concave bed described, which may be of any elementary and inexpensive construction.

The following is a description of the apparatus represented in the drawings: A is the bed-plate, to which the several parts of the apparatus are attached. B is the furnace, which has a blast-pipe, *b*. At the top of the furnace is the heat-conducting pipe C, which is lined with a suitable refractory material. It has a discharge-hole, *d*, through which the heat issues to the welding-edges of the tube D. E is the anvil, on one end of the shaft G, which is pivoted to the support H by means of the bolt *f*, to admit of its being turned out of line with the heat-conducting pipe to receive the tube, and then to be brought again into line with said pipe for the welding operation. It may have a handle on its outer end for its manipulation, as shown in the drawings.

I is the concave bed, which supports the lower side of the tube, while the welding-edges slide over the seat of the discharge-opening of the heat-conducting pipe and the anvil to be brought to a welding-heat, and welded together by the blows of the hammer J. The hammer has its vertical movements in the standard K, which projects upward from the bed-plate A.

I do not confine myself to the particular form of the hammer, nor to the vertical movement, as it may be made of any desired form, and have any other movement produced by any suitable mechanism.

The discharge-opening *d* is shown in the drawings at the upper side of the heat-conducting pipe; but it may be made through any part of its circumference, or through its end.

Having thus described my invention, I claim and desire to secure by Letters Patent of the United States—

1. The combination of the furnace B, provided with a laterally-projecting heat-conducting pipe, C, adapted to enter the tube, and having a discharge-opening, *d*, through any part of its circumference or through its end, to heat the interior of the tube, with a shaft, G, carrying an anvil, E, and likewise adapted to enter the tube, substantially as described.

2. The combination, with a furnace, B, provided, as described, with a laterally-extending heat-conducting pipe, C, of a laterally-projecting pivoted bar, G, carrying an anvil, E, and of a welding mechanism, K J, all substantially as described.

3. The combination, with a furnace, B, provided with a heat-conducting pipe, C, an anvil, G E, and a welding mechanism, K J, all organized and arranged as set forth, of a concave bed, I, of any desired height and radius, arranged in relation thereto, substantially as and for the purpose set forth.

In testimony whereof I have hereunto signed my name.

STEPHEN P. M. TASKER.

In presence of—

J. BONSALL TAYLOR,

W. C. STRAWBRIDGE.